BEST AVAILABLE COPY BEST AVAILABLE COPY
J. W. Norcross.
Oar Lock.
No 1,846. Reissued Jan. 3, 1865.
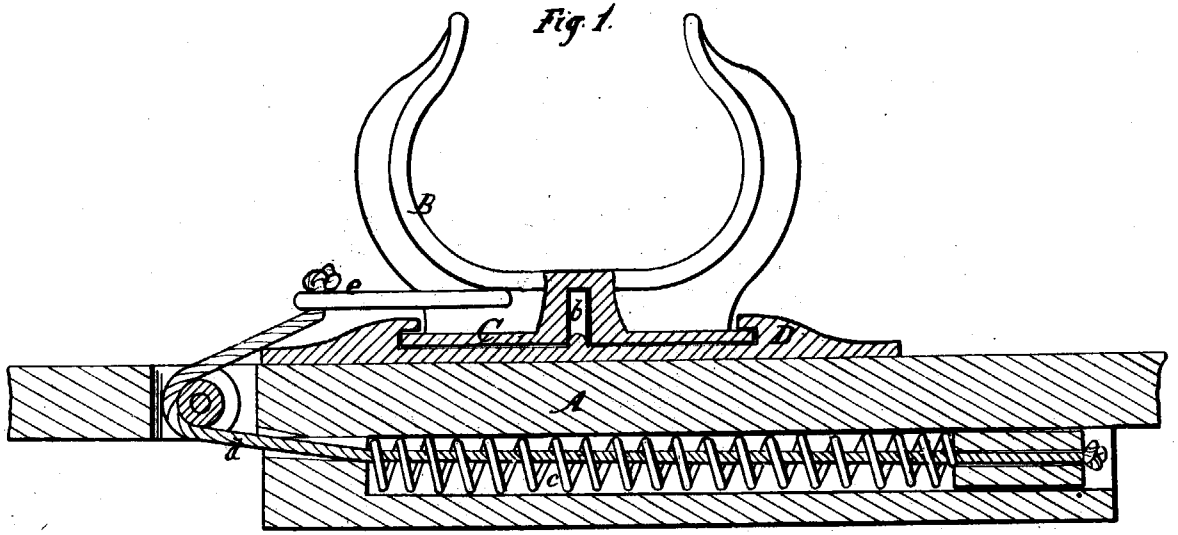
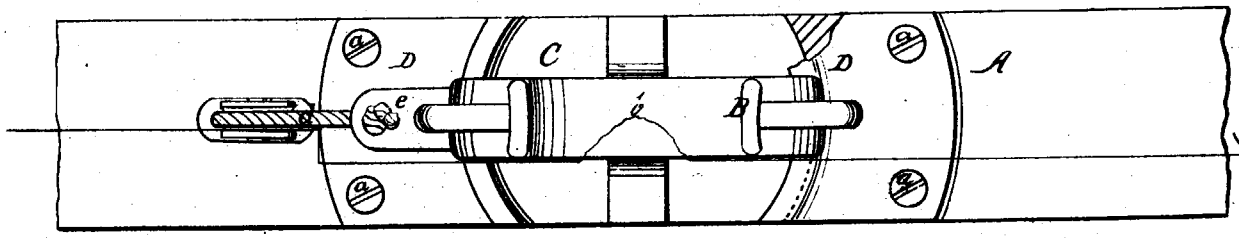
Witnesses.
W. Hauff
C. L. Topliff
Inventor
J. W. Norcross
N. PETERS, PHOTO-LITHOGRAPHER, WASHINGTON, D. C.

UNITED STATES PATENT OFFICE.

JOSEPH W. NORCROSS, OF MIDDLETOWN, CONNECTICUT.

IMPROVED ROWLOCK.

Specification forming part of Letters Patent No. 44,446, dated September 27, 1864; Reissue No. 1,816, dated January 3, 1865.

*To all whom it may concern:*

Be it known that I, JOSEPH W. NORCROSS, formerly residing at Boston, in the county of Suffolk and State of Massachusetts, now of Middletown, in the county of Middlesex and State of Connecticut, have invented a new and Improved Rowlock; and I do hereby declare that the following is a full, clear, and exact description thereof, which will enable those skilled in the art to make and use the same, reference being had to the accompanying drawings, forming part of this specification, in which—

Figure 1 is a sectional side elevation of this invention. Fig. 2 is a plan or top view of the same.

Similar letters of reference indicate like parts.

This invention consists in the employment or use of a plate or bracket secured to the edge of the gunwale, and provided with a pin projecting upward, to operate in combination with a rowlock, in such a manner that no hole or mortise is required in the gunwale, the rowlock being made to swivel above the edge thereof, and by the use of the plate the gunwale is strengthened, whereas by the ordinary rowlocks its strength is diminished.

It consists, further, in the use of a bracket or plate, in combination with a flange attached to or cast solid with the rowlock, either one of the two being provided with a rim overlapping the edge of the other in such a manner that in rowing the full strain of the oar is sustained by said rim, and the rowlock has no possible chance to break.

It consists, finally, in combining with the rowlock a spring of any desirable form and construction in such a manner that by the action of said spring the rowlock is kept parallel with the keel of the boat and prevented from turning edgewise, and consequently it is always in proper condition to ship the oar.

A represents the gunwale of a boat, to which the rowlock B is secured. This rowlock is made to swivel above the edge of the gunwale, and it is cast with or otherwise attached to a flange, C, which fits into a guide-bracket, D. Said bracket is cast of malleable iron or made of other suitable material, in one or more parts, and it is firmly secured to the edge of the gunwale by four (more or less) screws, *a*. It may be grooved to overlap the edge of the flange C, or not, as may be desired. A central pivot, *b*, keeps the rowlock in the center of the bracket, and, if said bracket is constructed as shown in the drawings, by turning the rowlock on this pivot the flange C is brought in such a position that it is free from the grooves in the bracket, and that the rowlock can be withdrawn and removed.

If the center-pin is strong enough, the groove in the bracket can be dispensed with; but in practice it is preferable to make the pin thin and use the guide-groove, either attached to the flange C or bracket D, so that in rowing the entire strain of the oar is sustained by the same and the bracket, which, being secured to the gunwale by a number of screws, rather strengthens the same, and the construction of the rowlock with the flange C prevents the possibility of breakage, whereas by rowlocks of the ordinary construction the gunwale is weakened and the shank of the rowlock is liable to break off just at the time when it is most needed.

A small chain may be attached to the bracket D and to some portion of the rowlock, to prevent it from dropping out accidentally; or the guide-groove in the bracket may be made circular, so that it embraces the flange C, and in this case it has to be made in two parts, one of which must be removed in order to enter the rowlock.

Furthermore, in practice it is most desirable to prevent the rowlock turning crosswise to the keel, which happens with the ordinary rowlock, and many a boat has been swamped and many lives lost because, in lowering the boat, the rowlocks were turned and the men not able to ship their oars in time to prevent an accident. This disadvantage I have overcome by applying a spring, *c*, which is situated in a suitable cavity under the rowlock, and connected by a cord or chain, *d*, with an arm, *e*, projecting from the same. This spring is connected to the rowlock, so that it will turn the same parallel with the keel, and at the same time it is so arranged that it does not prevent the turning and unshipping of the rowlock.

It is obvious that the connection between the spring *c* and the rowlock might be effected in various different ways. I do not wish to confine myself, therefore, to the precise construction of the spring and its connection with the rowlock as shown in the drawings, but reserve the right to alter the same as convenience may dictate. By the action of this spring the rowlock is held parallel with the keel, and whenever it is accidentally thrown out of this position it will return to the same spontaneously, and it is therefore in the proper position to receive the oar.

The shape of my rowlock is such that the curvatures of the two horns correspond to the diameter of the oar, and the bottom part of the lock is flat. By this arrangement the oar is prevented rising up at every stroke. It rests on the bottom of the rowlock, and moves back and forth between the horns without rising.

The rowlock will turn with every stroke of the oar, and works entirely noiseless.

I claim as new and desire to secure by Letters Patent—

1. The use of a plate or bracket, D, with center-pin *b*, applied in combination with a rowlock, B, and with the gunwale of a boat, substantially as and for the purpose set forth.

2. The flange C and bracket D, either one being provided with a rim overlapping the edge of the other, and applied in combination with a rowlock, B, of any desirable construction, substantially as and for the purpose described.

3. The spring *c*, applied in combination with the rowlock B, in the manner and for the purpose substantially as shown and described.

J. W. NORCROSS.

Witnesses:
J. P. HALL,
WM. P. MCNAMARA.